2,801,184
Patented July 30, 1957

2,801,184

COLLOIDAL SUSPENSION OF AMYLOSE AND ALPHA-AMYLODEXTRIN

Katsuhei Miyamoto, New York, N. Y.

No Drawing. Application January 18, 1952,
Serial No. 267,189

1 Claim. (Cl. 106—213)

The present invention relates to glue, more particularly adhesive compositions having water-resistant properties.

In the prior art adhesive preparations have been attempted using hydrolized starch products modified with synthetic resins to impart water-resistant characteristics to the adhesives. Such preparations have met with only moderate success because the presence of a high percentage of sugar in the hydrolized starch necessitates the employment of very substantially greater amounts of the synthetic resin, adding greatly to the cost of the products. Furthermore, such prior unsuccessful attempts have resulted in preparations characterized by a relatively high sugar content which prolongs the drying period and imparts a high degree of stringiness to the glue. Many of these hydrolized starch glues contain as high as from 30 to 50% sugar content based on the starch present and a preparation having the required adhesive characteristics cannot be made unless the total hydrolized starch content is at least from 35 to 50% in concentration.

A copending application, Serial No. 220,348 filed on August 10, 1951, by this applicant, describes the preparation of new enzymic substances from purified amylase having the remarkable property of converting the amylopectin content of the starch to $\alpha$-amylodextrin without affecting substantially the amylose. Preparation of these two enzymes identified as APA, acid amylophosphatase and APB, basic amylophosphatase is described in the aforesaid and other copending applications of this inventor. It has been shown that when the mixture of the enzymes APA and APB act upon a starch solution the final reaction product is predominated by amylose and $\alpha$-amylodextrin in the approximate ratio of 2 to 1 and the mixture is substantially devoid of maltose, the degradation product of normal starch hydrolysis. The solution of both these substances gives a blue coloration with iodine solution and upon standing the amylose solution becomes turbid and finally coagulates, while that of the $\alpha$-amylodextrin remains clear indefinitely.

An object of the invention is to provide new compositions of matter predominated by mixtures of amylose and $\alpha$-amylodextrin. Another and important object of the invention is to provide novel adhesive preparations and more particularly preparations having water-resistant properties.

It has been found that mixtures of amylose and $\alpha$-amylodextrin have remarkable adhesive properties and are particularly valuable as bases for the manufacture of water-resistant glues. These compositions are particularly valuable in exhibiting a degree of water-resistance in unmodified form and by the further desirable characteristics of rapid drying under atmospheric conditions, a low degree of stringiness and of providing greater body to the composition so that a substantially lower starch content is possible than with the usual hydrolized starches.

The preparation constituting the present invention is readily formed by the enzymic hydrolysis of starch solutions with mixtures of the enzymes APA and APB. In carrying out the invention solutions of various starches such as tapioca, arrowroot, potato starch or the like are suspended in water and a relatively small quantity of the enzyme mixture added to the suspension together with a small amount of an activator such as magnesium chloride, sodium chloride, calcium chloride and other chloride salts. This mixture is then heated to a temperature of about 70° C. and continuously agitated for a period of from 30 to 60 minutes to complete the conversion. The starch mixture first becomes creamy and then thins to a substantially lower viscosity as the reaction progresses.

In certain cases various oxidizing agents may be added to the hydrolized starch mixture formed in accordance with this procedure. For this purpose calcium or sodium hypochlorite, potassium permanganate, sodium dichromate, hydrogen peroxide and the like may be incorporated into the mixture while maintaining the temperature at approximately the same value.

To enhance the water-resistant characteristics of the final product it has been found highly desirable to incorporate into the mixture synthetic resins which can be made compatible or miscible with the reaction product. For this purpose a melamine formaldehyde resin powder manufactured by American Cyanamid Company as "Melmac 405" has produced exceptional results. Various vinyl resins and especially vinyl polymers such as "Vinylite" manufactured by the Bakelite Corporation may likewise be employed. Other resins having compatible characteristics with the amylose, $\alpha$-amylodextrin mixture may be employed, including styrenes, Glyptals and various other synthetic polymers.

More specifically the invention may be carried out as illustrated by the following examples:

Example 1

150 g. of tapioca starch is suspended in 850 cc. of tap water forming a 15% solution. A 1% solution of a mixture of equal quantities of enzymes APA and APB prepared in accordance with the copending application, and 15 cc. of this solution were added to the above suspension together with 5 g. of magnesium chloride. The mixture was heated in a water bath to a temperature of about 70° C. and agitated continuously by a mechanical stirrer at this temperature for a period of about 45 minutes. The starch mixture was first creamy and then became thicker in texture. As the enzymic reaction progressed the mixture became less viscous and at the end of the reaction became a transparent coliodial solution. The product showed greatly increased adhesive strength, film forming capacity and fluidity over unprocessed starch solutions of the same concentration. When tested by Fehling's solution it was found that reducing sugar was absent from the final reaction product.

In order to increase the water-resistance of the product as prepared above the process was extended as follows. 1 g. of calcium hypochlorite was added to the collodial solution while maintaining the temperature at about 70° C. and the stirring continued until the reaction was complete. Treatment with the hypochlorite substantially increased the fluidity of the preparation without causing sugar formation, as determined by the Fehling test.

Treatment of the amylose, $\alpha$-amylodextrin mixture with an oxidizing agent such as calcium hypochlorite increases the fluidity of the preparation without precipitation of the amylose, apparently for the reason that retrogradation of the amylose into higher molecular weight products is apparently prevented and the product stablized.

To the stablized fluid preparation 15 g. of powdered urea formaldehyde resin, disbursed in 75 cc. of hot water, is added and the mixture agitated at slightly higher temperature until the resin becomes compatible with the amylose, $\alpha$-amylodextrin mixture. The product when tested on multiple layer asphalt lined kraft paper was found to be highly water-resistant and produced a very firm bond between the paper. This test consists in forming a paper cup out of a rectangular piece of the kraft paper by gluing the inside edges together. The cup is then filled with water and allowed to stand at room temperature for a period of six weeks, whereupon it was observed that the glue bind was still water-resistant. The glue formed by this example is well adapted for use in the corrugated box industry.

*Example 2*

The experiment performed above was repeated employing potato starch and 10 g. of Vinylite resin in place of the tapioca starch and urea formalin resin to form a glue having a high degree of water-resistance for many useful applications. A suitable Vinylite resin is one obtained by the conjoint polymerization of vinyl chloride and vinyl acetate.

*Example 3*

Example 1 was repeated utilizing potato starch in place of the tapioca starch and this preparation additionally treated with 10 g. of urea formaldehyde resin to produce a glue having high adhesive properties for the paper industry, with a substantial degree of water-resistance.

*Example 4*

Example 1 was again repeated using a 30% tapioca starch solution and 30 g. of urea formaldehyde resin to produce an ice-resistant glue.

Other experiments were run employing various amounts of other synthetic resins to produce glues having highly desirable properties for specialized applications.

Various changes may be made in the foregoing procedure without departing from the spirit and scope of the invention as defined by the claim.

I claim:

As a composition of matter a collodial aqueous suspension composed of approximately two parts of amylose to one part of $\alpha$-amylodextrin.

References Cited in the file of this patent

UNITED STATES PATENTS

| | | |
|---|---|---|
| 2,141,313 | Osgood | Dec. 27, 1938 |
| 2,496,440 | Caesar | Feb. 7, 1950 |
| 2,608,723 | Wolff | Sept. 2, 1952 |
| 2,702,283 | Wilson et al. | Feb. 15, 1955 |
| 2,702,755 | Chaney | Feb. 22, 1955 |